(No Model.) 2 Sheets—Sheet 1.
R. A. STRONG & G. R. COOTÉ.
FRUIT CLEANING MACHINE.
No. 459,337. Patented Sept. 8, 1891.
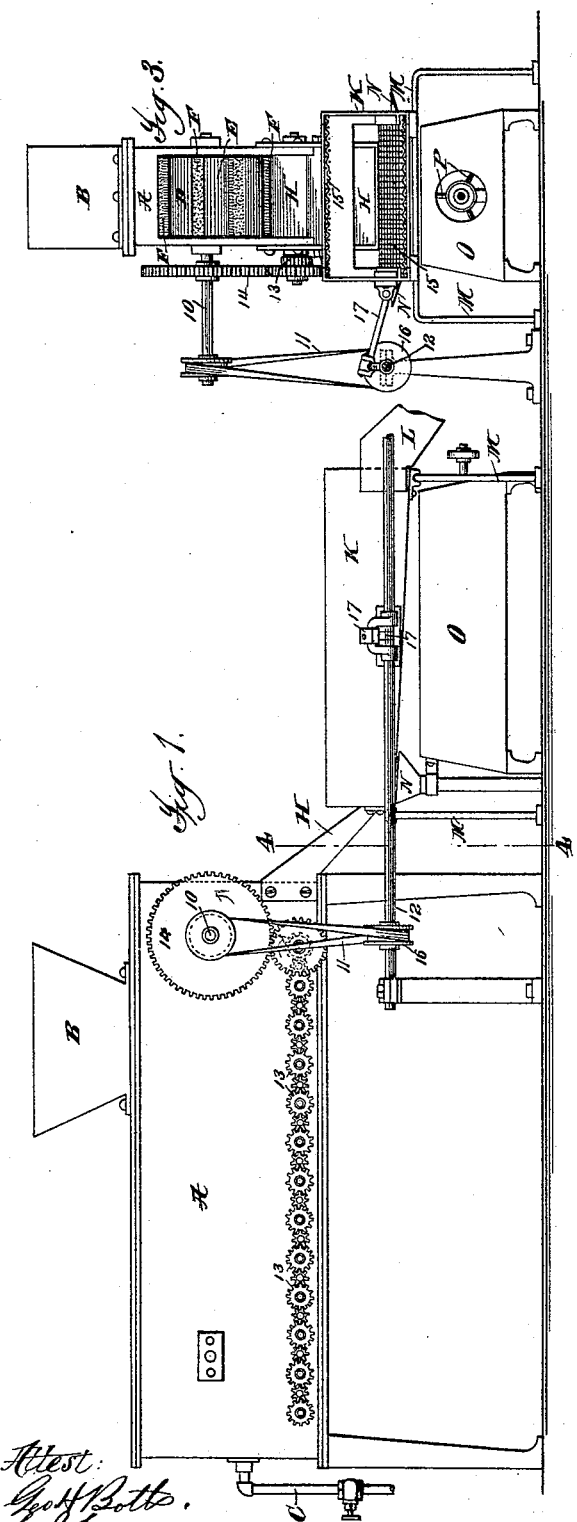

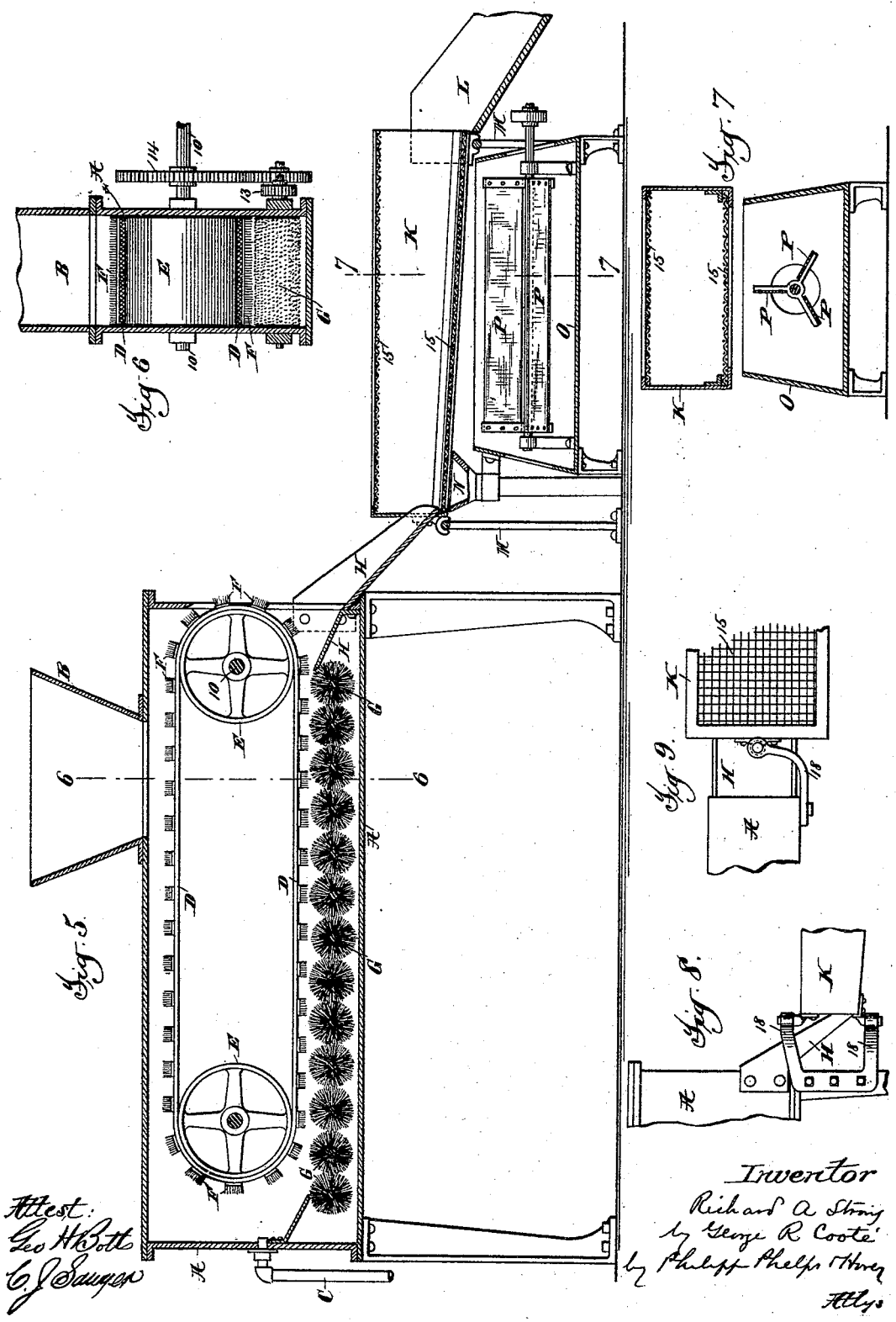

UNITED STATES PATENT OFFICE.

RICHARD A. STRONG AND GEORGE R. COOTÉ, OF BROOKLYN, NEW YORK.

FRUIT-CLEANING MACHINE.

SPECIFICATION forming part of Letters Patent No. 459,337, dated September 8, 1891.

Application filed March 26, 1891. Serial No. 386,522. (No model.)

*To all whom it may concern:*

Be it known that we, RICHARD A. STRONG and GEORGE R. COOTÉ, citizens of the United States, residing at Brooklyn, county of Kings, and State of New York, have invented certain new and useful Improvements in Fruit-Cleaning Machines, fully described and represented in the following specification and the accompanying drawings, forming a part of the same.

The object of the present invention is to provide a machine for cleaning dried fruit, such as currants, cherries, prunes, and other small fruits; and to this end the invention consists in various constructions and combinations of parts in an organized fruit-cleaning machine, all of which will be particularly described in the following specification, and pointed out in the claims.

For a full understanding of the invention a detailed description of the preferred form of machine embodying the same will now be given, reference being had to the accompanying drawings, forming a part of this specification, in which—

Figure 1 is a side elevation of the complete machine. Fig. 2 is a plan of the same. Fig. 3 is an end elevation looking to the left in Fig. 4. Fig. 4 is a section looking to the right from line 4 4 in Fig. 1. Fig. 5 is a central longitudinal section of the machine. Fig. 6 is a cross-section of the line 6 6 of Fig. 5. Fig. 7 is a cross-section on the line 7 7 of Fig. 5. Figs. 8 and 9 are respectively a side elevation and plan showing in detail a modified form of sifter.

Referring now to said drawings, it will be seen that the machine consists, generally, of two parts—a washing apparatus in which the fruit is washed and brushed to loosen and remove the dirt and a screening and drying apparatus in which the fruit and dirt are separated and the fruit dried.

The washing apparatus shown consists of a tank A, provided with a hopper B, through which the fruit is introduced, and a pipe C, through which water is admitted to the tank from any suitable supply. Within the tank the endless belt D moves longitudinally of the tank, this belt being of substantially the same width as the interior of the tank. This belt passes around two pulleys E, and is driven from the shaft 10 by belt 11, through which power is transmitted from the power-shaft 12. It will be understood, however, that the driving mechanism may be of any other suitable form. The belt D passes under the hopper B and is provided upon its outer surface with a series of brushes F, extending entirely across the face of the belt, so that the latter forms a traveling brush. The brushes preferably are set at small distances apart, as shown, so as to form a broken brush-surface. They may, however, be placed close together, so as to form a continuous brush-surface, although it will be found that a better result is obtained with the construction shown. In the lower part of the tank, below the traveling brush, is mounted a series of rotary brushes G, which are driven in the same direction as the traveling brush by a series of intermediate gears 13, through which power is transmitted from the driving-gear 14 on shaft 10. From the washing apparatus the fruit passes down an inclined chute H to the screening and drying apparatus, this chute being preferably extended inside the tank to the top of the last rotary brush and serving to keep the level of the water at substantially the meeting line of the traveling and rotary brushes.

The sifter consists of a box K, the bottom of which is formed of a sheet of screening 15, the mesh of which is of sufficient size to retain the fruit which the machine is constructed to clean, but to permit the passage of the smaller foreign material, the sifter preferably being so constructed that the screening-bottoms may readily be inserted and removed, enabling bottoms of different mesh to be used for fruit of different sizes. The top of the sifter is preferably made of a sheet of similar screening 15, for a purpose hereinafter stated. The sifter K is open at both ends and at one end receives the fruit and the water that passes with it from the chute H and at the other end delivers the screened fruit down the chute L to any suitable receptacle. The sifter K is mounted to slide freely upon ways M, and is moved to and fro by crank 16, carried by power-shaft 12, and connected to the sifter midway of its length by connecting-rod 17, the width of the sifter being sufficiently in excess of that of the chute H to permit this movement without the sifter passing outside the chute. A drain N is mounted below the sifter at the end next the chute H and is of sufficient length to extend across the sifter in any position of the latter, so as to receive the water as it passes into the moving sifter from the chute H.

The to-and-fro movement of the sifter may be found to furnish sufficient agitation for the removal of the foreign matter from the fruit, and the contact with the air thus produced may be relied upon for drying the fruit. We prefer, however, to provide for a current of air through the fruit to assist in the screening process, and especially in drying the fruit, and the blower used for this purpose is preferably placed below the sifter, so as to force a strong current of air upward through the sifter, thereby carrying out any small light particles through the screening which forms the top of the sifter. Any suitable form of blower may be used. As shown, the blowing apparatus consists of a box O, mounted below the sifter and open at the top and both ends, and a three-bladed blower P, rotating therein, so as to force the air upward from the box through the sifter. This blower may be driven from the power-shaft 12 by a belt, for which a pulley is shown, or in any other suitable manner.

It may be found that a vibrating movement of the sifter is preferable to the rectilinear movement, as the end of the sifter next the chute H may thus be practically stationary and the size of the drain and of the sifter correspondingly reduced. Such a construction is shown in Fig. 8, in which the sifter K is pivoted at top and bottom in arms 18, supported on the frame of the machine, so that the sifter is free to oscillate in a horizontal plane.

The operation of the machine is as follows: As the fruit is fed into the washing-tank A through the hopper B it is received upon the belt D, forming the traveling brush, and is carried to the opposite end of the tank, where it passes downward onto the rotary brushes G and is mixed with the water which is admitted through the pipe C and flows through the tank with its level at about the meeting plane of the brushes. The fruit is carried along by the traveling and rotary brushes and is thoroughly brushed and cleaned thereby, the flow of the water being sufficient to keep the fruit constantly supplied with fresh water. As the fruit reaches the end of the brushes it passes downward over the inclined chute H to the sifter K, and the water is discharged through drain N, leaving only the fruit and the small amount of dirt which is not removed with the water. The constant vibration of the sifter by the crank 16 produces an agitation of the fruit, which is assisted by the blower E, so that all the smaller particles of foreign material are removed either by being blown through the top of the sifter or by passing through the screening forming the bottom of the same, and the fruit is dried by the contact with the air produced by the movement of sifter and the current from the blower. The sifter is set, preferably, at a slight incline, as shown, so that the fruit passes through it at such a speed as to produce the best results; but it is evident that a horizontal sifter may be used, if desired, and the fruit remain therein until a lot is dried and then removed; but the construction shown is preferable, a better action being thus produced and a perfectly automatic cleaning-machine thus provided. The clean fruit as it leaves the open lower end of the sifter passes down the chute L to the receptacle provided for it.

It is evident that many modifications may be made in the machine shown as embodying the invention without departing therefrom, and we do not intend to be limited to the exact construction shown.

What we claim is—

1. In a fruit-cleaning machine, the combination of a series of rotary brushes and a traveling belt carrying a series of brushes set at a distance apart, so as to form a broken brush-surface, said rotary and traveling brushes co-acting to advance and brush the fruit, substantially as described.

2. In a fruit-cleaning machine, the combination of a washing-tank supplied with water, and a traveling brush and series of rotary brushes in said tank, between which the fruit passes and by which it is advanced and brushed, substantially as described.

3. In a fruit-cleaning machine, the combination of a washing-tank through which a current of water flows, and a traveling brush and series of rotary brushes in said tank, between which the fruit passes and by which it is advanced, the level of the water in said tank being at or about the meeting plane of the brushes, substantially as described.

4. In a fruit-cleaning machine, the combination of a washing-tank receiving the fruit at one end and water at the opposite end, a traveling brush on which the fruit is carried from the fruit-receiving end to the water-receiving end, and a series of brushes placed below said traveling brush and rotating in the direction of movement of the traveling brush, said traveling and rotary brushes co-acting to advance and brush the fruit, substantially as described.

5. In a fruit-cleaning machine, the combination of a washing-tank through which a current of water passes, a traveling brush and series of rotary brushes, between which the fruit passes and by which it is advanced through said tank, and a screening and drying apparatus to which the fruit passes from the tank, substantially as described.

6. In a fruit-cleaning machine, the combination of a washing-tank supplied with water, and two series of brushes in said tank, between which the fruit passes and by which it is advanced and brushed, substantially as described.

7. In a fruit-cleaning machine, the combination, with a washing apparatus, of a vibrating sifter to which the fruit passes from the washing apparatus, said sifter consisting of a box having a screen top and bottom, and a blower located below said sifter and forcing air upward through the same, substantially as described.

8. The combination of a vibrating sifter consisting of a box having a screen top and bottom, and a blower located below said sifter and forcing air upward through the same, substantially as described.

In testimony whereof we have hereunto set our hands in the presence of two subscribing witnesses.

RICHARD A. STRONG.
GEORGE R. COOTÉ.

Witnesses:
GEORGE H. BOTTS,
J. J. KENNEDY.